(12) United States Patent
Pedersen et al.

(10) Patent No.: US 6,998,966 B2
(45) Date of Patent: Feb. 14, 2006

(54) MOBILE COMMUNICATION DEVICE HAVING A FUNCTIONAL COVER FOR CONTROLLING SOUND APPLICATIONS BY MOTION

(75) Inventors: Thomas Pedersen, Frederiksberg (DK); Rasmus Christjansen, Hedehusene (DK)

(73) Assignee: Nokia Corporation, Espoo (FI)

( * ) Notice: Subject to any disclaimer, the term of this patent is extended or adjusted under 35 U.S.C. 154(b) by 285 days.

(21) Appl. No.: 10/723,871

(22) Filed: Nov. 26, 2003

(65) Prior Publication Data

US 2005/0110752 A1      May 26, 2005

(51) Int. Cl.
*G08B 3/00*      (2006.01)
*H04M 1/00*      (2006.01)

(52) U.S. Cl. .............. 340/384.1; 340/686.1; 340/692; 340/7.58; 340/7.63; 345/158; 455/575.3

(58) Field of Classification Search ........... 340/384.1, 340/7.63, 7.51, 7.58
See application file for complete search history.

(56) References Cited

U.S. PATENT DOCUMENTS

| | | | |
|---|---|---|---|
| 2003/0197597 A1 * | 10/2003 | Bahl et al. ................. | 340/7.58 |
| 2004/0066302 A1 * | 4/2004 | Menard et al. ............. | 340/669 |
| 2004/0204125 A1 | 10/2004 | Messel et al. .............. | 455/566 |

FOREIGN PATENT DOCUMENTS

| WO | WO 03/075548 A1 | 9/2003 |
|---|---|---|
| WO | WO 03/077505 A2 | 9/2003 |

* cited by examiner

*Primary Examiner*—Donnie L. Crosland
(74) *Attorney, Agent, or Firm*—Perman & Green, LLP.

(57) ABSTRACT

This invention relates to a mobile communication device (200) having a functional cover (202) for controlling sound applications by means of measuring motion of said functional cover (202). In particular, the present invention relates to a functional cover (202) for a mobile communication device (200) measuring motion and providing a control signal to the mobile communication device (200) in accordance herewith.

17 Claims, 3 Drawing Sheets

MOBILE COMMUNICATION DEVICE HAVING A FUNCTIONAL COVER FOR CONTROLLING SOUND APPLICATIONS BY MOTION

FIELD OF INVENTION

This invention relates to a mobile communication device having a functional cover for controlling sound applications by means of measuring motion of said functional cover. In particular, the present invention relates to a functional cover for a mobile communication device measuring motion and providing a control signal to the mobile communication device in accordance herewith.

BACKGROUND OF INVENTION

A functional cover is an enhancement product or peripheral for a mobile communication device such as a mobile or cell phone, a personal digital assistant, a portable computer or any combination thereof. The functional cover has electrical functionality and interface enabling data transfer between the mobile communication device and the functional cover.

International patent application WO 03/075548 discloses a functional cover for use with a wireless terminal, which functional cover comprises one or more keys adapted to play at least one sound. The keys may be adapted for sound creating purposes, which may comprise music composing applications, sound creating applications, gaming applications, ring-tone creation and application, system sound creation and application, or sending sounds with a multimedia messaging service (MMS) message.

Further, patent application Ser. No. 10/096,491 discloses a mobile communication device comprising a memory for storing a plurality of sequences for the activation of lights and means for selectively assigning a stored sequence to a particular event such as incoming calls, incoming calls or message from a particular caller or caller group, key lock, key unlock, power on/off, calendar alarm and etc. The mobile communication device may comprise means for recording an audio signal and means for transforming said audio signal into a control signal for activation of the lights, which are mountable in an exchangeable/removable front or back cover.

The above referenced international and American patent applications, which hereby are incorporated into present specification by reference, provide means for establishing utilisations of a functional cover in connection with a mobile communication device. The patent applications, in particular, provide means for recording a sound and utilising said sound for various purposes such as for converting said sound to a signal for controlling activation of a light or for saving said sound as part of a tune. That is, the prior art enables an operator to generate a particular sound by operating a keyboard or to generate a particular light response associated with an operation of the mobile communication device by operating a keyboard. Hence there is a need for providing further user interface platforms enabling an operator to activate the mobile communication device besides voice or keyboard activations.

SUMMARY OF THE INVENTION

An object of the present invention is to provide a functional cover for controlling sound applications on a mobile communication device in accordance with motion of said functional cover.

Further, it is an object of the present invention to provide a mobile communication device having a functional cover for controlling sound applications on said mobile communication device in accordance with motion of said functional cover.

A particular advantage of the present invention is provision of a user interface enabling a user to control an application by moving a functional cover mounted on a mobile communication device.

A particular feature of the present invention is provision of means for generating a sound or audio effect caused by motion of the functional cover.

The above objects, feature and advantage together with numerous other objects, advantages and features, which will become evident from below detailed description, are obtained according to a first aspect of the present invention by a functional cover for connecting to a mobile communication device and comprising an accelerometer for measuring movement of said functional cover and providing a movement signal, a memory for storing an instruction set, and a processor for selecting an instruction from said instruction set in said memory in accordance with said movement signal.

The functional cover according to the first aspect of the present invention provides an additional interfacing means for controlling actions of the functional cover or mobile communication device.

The functional cover according to the first aspect of the present invention may be adapted to control sound applications in accordance with motion of the functional cover and further may be adapted to generate a sound in accordance with motion of the functional cover. The combination of the being able to control sound by motion and to control applications relating to sound control provides an excellent and simple interface for the user of a mobile communication device and enables the user to adopt a particular personalized sound configuration for a mobile communication device.

The functional cover according to the first aspect of the present invention may further comprise a synthesizer for generating an electrical audio signal in accordance with the movement signal and a loud speaker unit adapted to receive the electrical audio signal and generate a sound in accordance herewith. The synthesizer may be operable to generate a control signal and the loud speaker unit may comprise an amplifier for amplifying the electrical audio signal and adapted to receive the control signal. The control signal may be operable to control frequency, clang, tone, pitch, loudness, volume, treble, and/or bas of the electrical audio signal.

The accelerometer according to the first aspect of the present invention may comprise a first sensor measuring movement along a first axis, which is aligned longitudinally to the functional cover and a second sensor measuring movement along a second axis perpendicular to the first axis. Hence the accelerometer in this configuration provides a two-dimensional measurement of movement, which is advantageous, for example, for controlling a game played on the mobile communication device and/or for generating a particular audio effect.

The accelerometer may further comprise a third sensor measuring movement along a third axis perpendicular to the first and second axis. This configuration of the functional cover provides a three-dimensional measurement of movement, which may advantageously be used, for example, for generating a drum sound while moving the functional cover attached to the mobile communication device as a drum stick.

The audio effects (sounds) may be sounds which may be applied to music from a second functional cover attached to the mobile communication device comprising a MP3 player. Alternatively, the audio effects may further be sounds of a StarWars™ lightsaber or sword whistling through the air, as the mobile communication device with its attached one or more functional covers is moved.

Further, the audio effects may advantageously be combined with gaming operations. This may, for example, advantageously be implemented in a car driving game, where the manoeuvring of the car is handled by the movement of the functional cover, which provides shrieking noises when the car makes sharp turns.

The first, second and third sensor for measuring movement along the first, second and third axis, respectively, may be utilised for sound application control such as bas, treble, pitch, clang, and volume control of sound generating application or any combination thereof. The movement of the functional cover may thus advantageously be used for controlling a wide variety of applications per se and a combination of applications.

The memory according to the first aspect of the present invention may further comprise flash memory capacity. Alternatively or additionally, the memory may comprise optical, magnetic or electric recording means such as magneto-optic storage devices.

The processor according to the first aspect of the present invention may comprise a micro-controller. The processor may in fact be implemented by any of the street processors, however, advantageously the processor is incorporated in a micro-controller together with local memory facility such as ROM and RAM for storing interface protocols and together with a signal conversion means such as analog to digital converter and sample and hold unit. The processor may connect to the memory through a high speed data carrying bus.

The processor may further comprise an interface element for controlling communication between the functional cover and a mobile communication device in accordance with a communication protocol. The interface element may comprise hardware and software modules, which hardware modules may comprise connectors and wiring and which software modules may comprise applications accessing a local memory for interface protocol data.

The instruction set according to the first aspect of the present invention may comprise internal or external operation system instructions, application instructions or any combination thereof. The instruction set stored in the memory may, in fact, comprise any user defined actions to be taken when the functional cover moves in the first, second and/or third direction. This effect provides a particularly versatile mobile communication device when attached to the functional cover according to the first aspect.

The above objects, advantages and features together with numerous other objects, advantages and features, which will become evident from below detailed description, are obtained according to a second aspect of the present invention by a mobile communication device comprising connector means for connecting to a functional cover according to the first aspect of the present invention.

The mobile communication device according to the second aspect of the present invention provides a significant improvement to prior art interface technologies used for mobile phones.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawing, wherein.

DETAILED DESCRIPTION OF PREFERRED EMBODIMENTS

In the following description of the various embodiments; reference is made to the accompanying drawing which form a part hereof, and in which by way of illustration various embodiments is shown in which the invention may be practiced. It is to be understood that other embodiments may be utilized and structural and functional modifications may be made without departing from the scope of the present invention.

Figure 1:
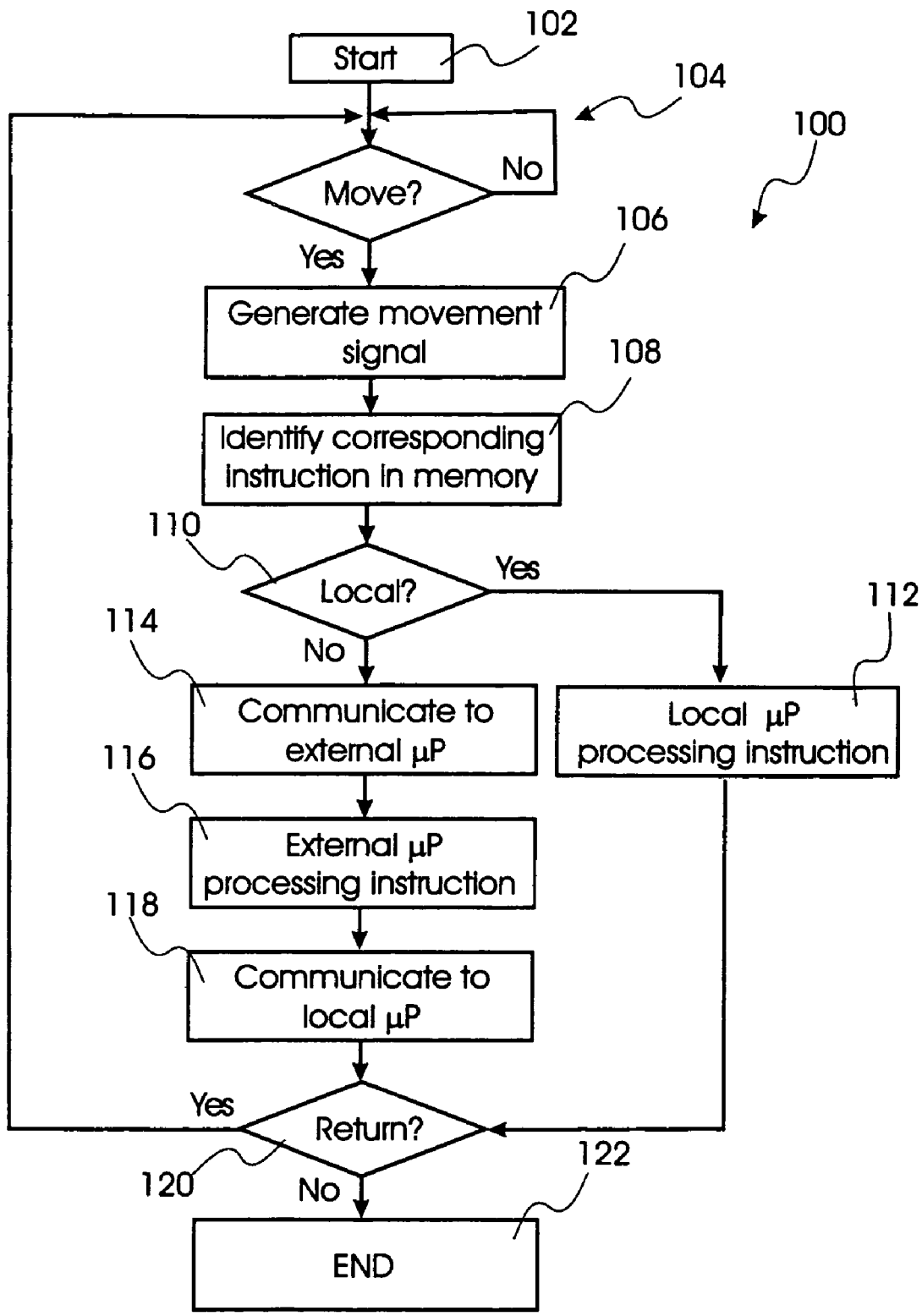
FIG. 1, shows a flow chart of operation of a functional cover according to a first embodiment of the present invention connected to a mobile communication device.

FIG. 1, shows a flow chart of operation of a functional cover according to the preferred embodiment connected to a mobile communication device, which operation is designated in entirety by reference numeral 100.

The operation of the functional cover starts in step 102. The starting process includes powering up the functional cover and possible authentication of the functional cover. Since the functional cover utilises movement or motion for controlling sound applications the operation 100 comprises a conditional loop 104 during which the functional cover awaits movement of the functional cover. When the functional cover detects movement the functional cover generates a movement signal during step 106. The processor of the functional cover interprets the movement signal during step 108 and identifies a corresponding instruction in an associated memory. The processor further identifies during step 110 whether the instruction is associated with an external or internal application. If the instruction is internal, the processor of the functional cover 112 processes it in step 112. On the other hand if the instruction is external, the instruction is communicated to the connecting mobile communication device during step 114. In step 116 the external processor, i.e. a processor of the mobile communication device processes the instruction. Subsequently, in step 118 the processor of the mobile communication device communicates an acknowledgement of reception of the instruction or a return instruction for the processor of the functional cover. The processor of the functional cover determines in step 120 whether the operation is to return to a movement detecting mode, namely to loop 104, or to end in step 122.

Figure 2A:
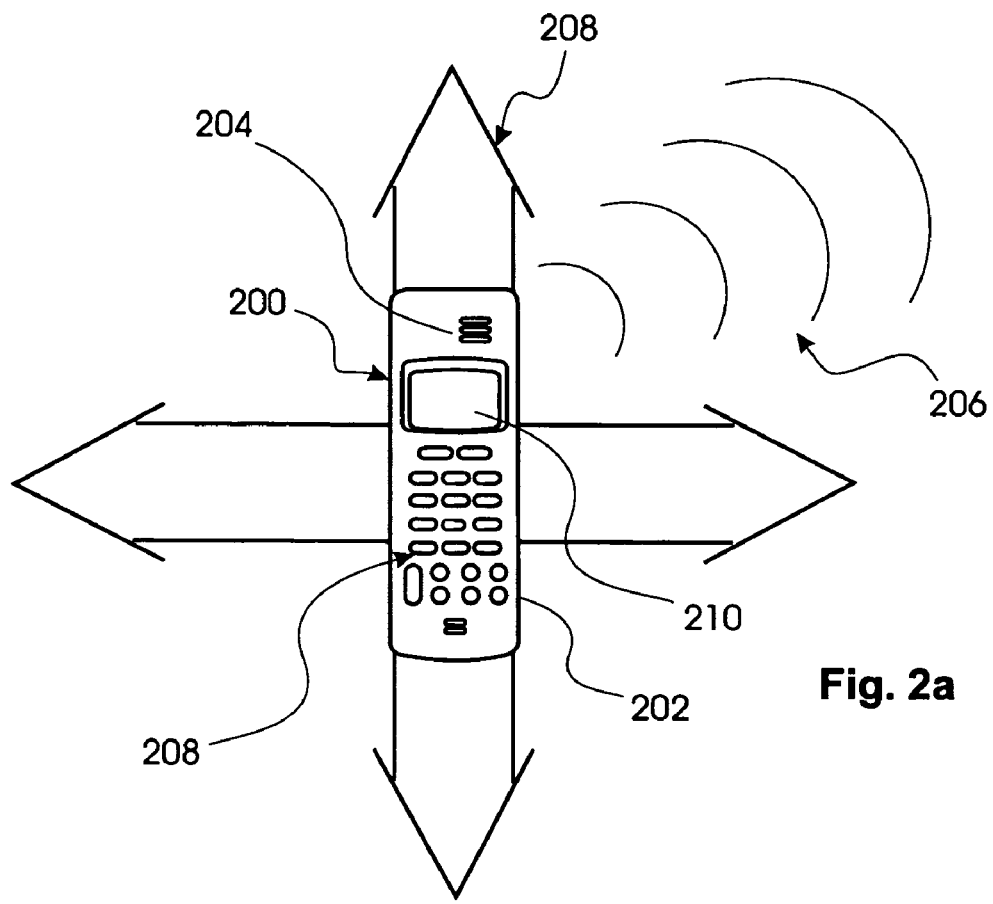
FIG. 2a, shows a mobile communication device connected to a functional cover according to the first embodiment of the present invention.

FIG. 2a, shows a mobile communication device 200 connected to a functional cover 202. Movement or motion of the mobile communication device 200 and thereby of the functional cover 202 generates an audio effect from the loud speaker 204 of the mobile communication device 200. This audio effect is visualized by waves 206 and the movement is visualized by arrows 208. The movement may be in the plane indicated in FIG. 2a and, in addition hereto, in a plane perpendicular to the arrows 208. The movement causes an accelerometer, shown in FIG. 2b as reference numeral 212, to generate a movement signal, which is processed by a local processor of the functional cover 202. The local processor interprets the movement signal and identifies a corresponding instruction in an instruction set in a memory. The instruction may relate to a sound application for controlling a sound in accordance with movement of the mobile communication device 200 and thereby in accordance with movement of the functional cover 202. The instruction may incorporate a sound or audio effect to be forwarded to the loud speaker 204 or may be a control signal for adjusting sounds from the loud speaker 204. That is, the instructions may relate directly to a sound or audio effect to be presented to a user of the mobile communication device 200 such as a drum sound, Star Wars™ lightsaber sound, or any other sound, or the instructions may relate to qualitative measures of a sound to be presented to the user of the mobile communication device 200 such as volume, loudness, pitch, bas, treble, clang or any combination thereof.

The audio effects (sounds) may be, for instance, drumming sounds that may be applied to music from a second functional cover attached to the mobile communication device comprising an MP3 player.

Figure 2B:
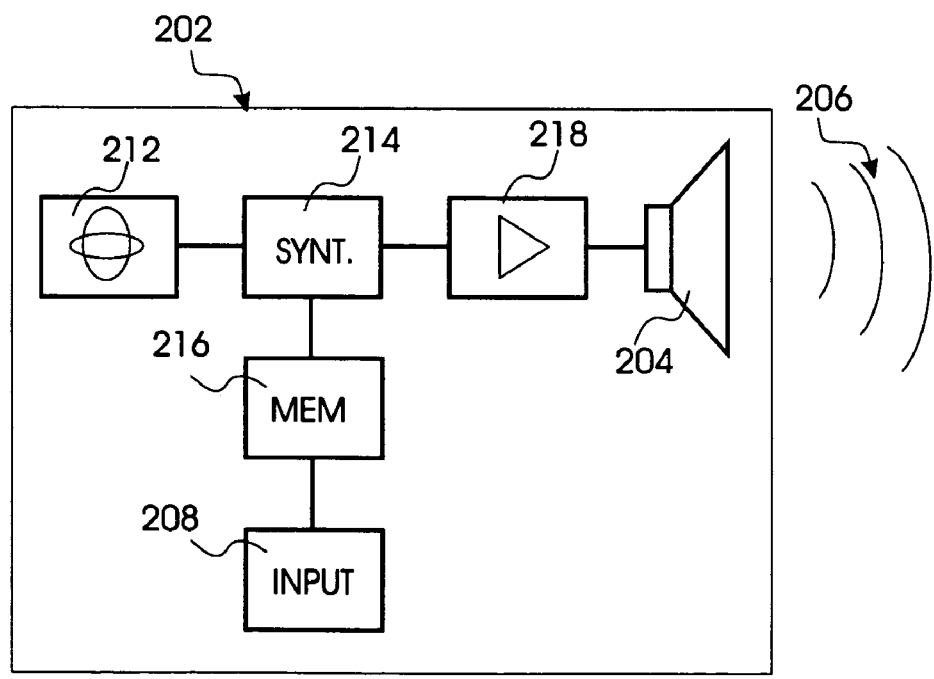
FIG. 2b, shows a block diagram of the function cover according to the second and third embodiments of the present invention.

FIG. 2b, shows a block diagram of a functional cover 202 according to a second embodiment of the present invention. The functional cover 202 comprises an accelerometer 212 generating a movement signal to a local processor or directly to a synthesizer 214, which synthesizer 214 converts the movement signal into an electrical audio signal, such as described above. The synthesizer 212 communicates the electrical audio signal to an amplifier 218 amplifying the electrical audio signal and communicating the amplified electrical audio signal to the loud speaker 204 generating the audio effect. Hence in these embodiments the functional cover 202 acts as an input device for the synthesizer 214 by assigning attributes to movements in particular directions, which are detected and recorded by the accelerometer 212. The attributes may be sound frequency, clang, tone, pitch, loudness, volume, bas, treble and any combination thereof.

In an embodiment the processor used for the sound control and the appurtenant instruction set are internal in the synthesizer 214.

In another embodiment the output signal from the synthesizer 214 may be coupled to the connected mobile phones amplifier and loudspeaker.

In a functional cover 202 according to a third embodiment of the present invention, the functional cover 202 further comprises a memory 216 for storing a bank of electric audio signals defining a plurality of sounds. The memory 216 connects to the synthesizer 214 and communicates specific electric audio signals to the synthesizer 214 in accordance with instructions or commands received from the user interface 208.

In an embodiment the processor used for the sound control and the appurtenant instruction set are internal in the synthesizer 214 as well as the sound data base 216.

In another embodiment the output signal from the synthesizer 214 may be coupled to the connected mobile phones amplifier and loudspeaker.

The functional cover 202 thus improves the general user interface of a mobile communication device, namely keypad 208 and display 210.

The accelerometer comprises one, two and/or three sensors for measuring movement along a three axes. Hence the accelerometer may provide a two or three dimensional measurement of movement.

Figure 3:
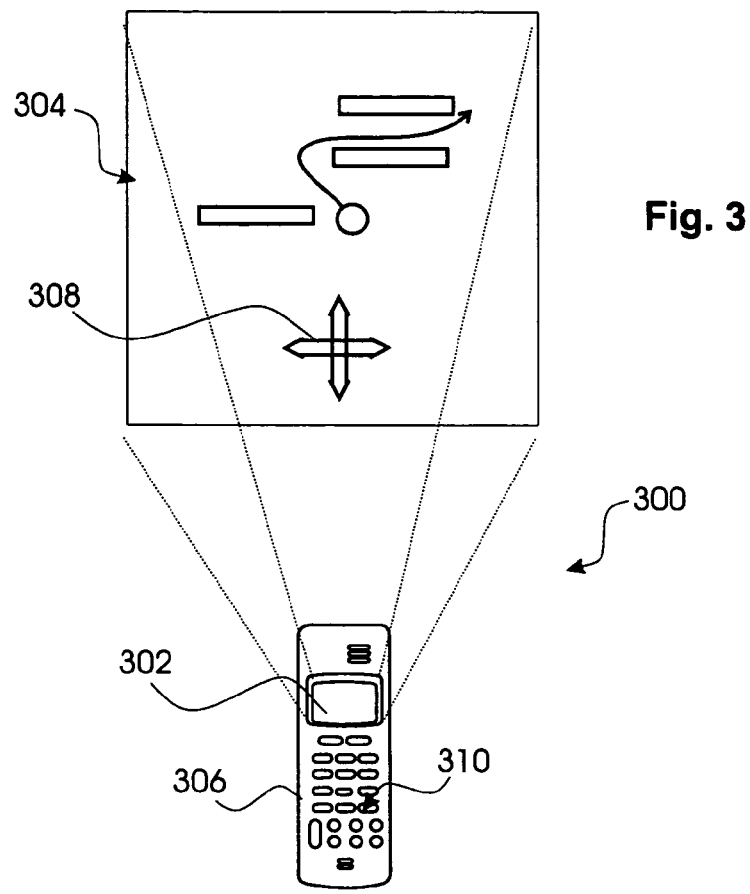
FIG. 3, shows a mobile communication device according to a fourth embodiment of the present invention.

The audio effects may advantageously be combined with gaming operations such as shown in FIG. 3. FIG. 3, shows a mobile communication device 300 according to a fourth embodiment of the present invention. The mobile communication device comprises a display 302 for interfacing with an operator of the mobile communication device 300 by for example playing a game shown enlarged as reference numeral 304. The mobile communication device 300 is connected to a functional cover 306 including a accelerometer, shown as reference numeral 402 in FIG. 4. The accelerometer 402 provides a movement signal to a processor, shown in FIG. 4 as reference numeral 406, in the functional cover 306 and the processor interprets the movement signal in accordance with predefined operations. In this example the accelerometer 406 measures the movement of the functional cover so as to generate an instruction 308 for the game 304 interface in combining a cursor with an associated audio effect. In this way the operator of the mobile communication device may by movement of the functional cover 306 control the game 304 as if applying curser keys on a keypad 310. This effect provides great advantages over prior art, since the operation of the mobile communication device is significantly simplified.

Figure 4:
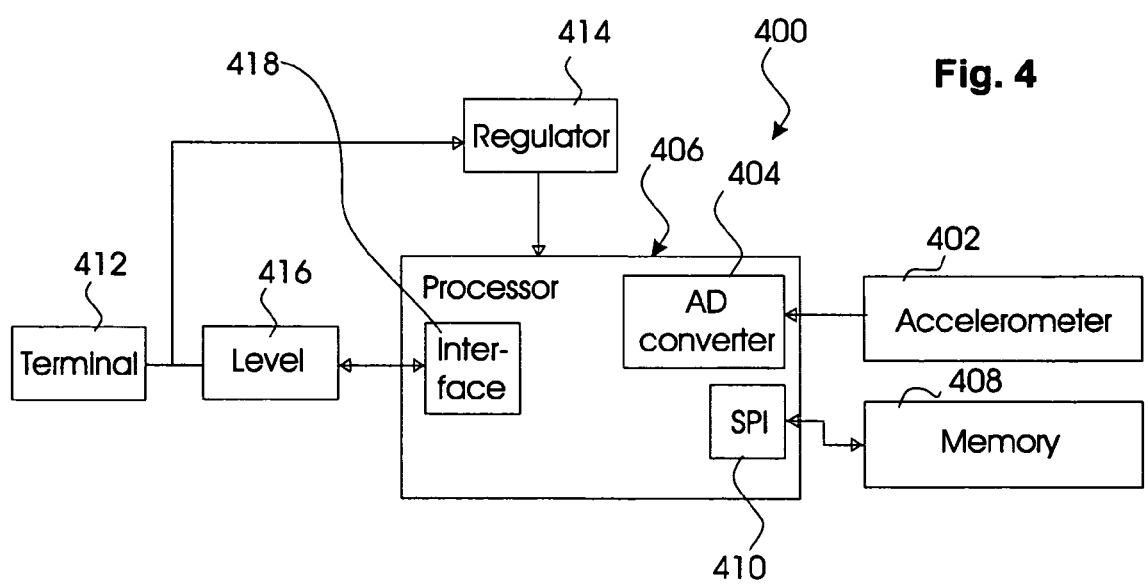
FIG. 4, shows a block diagram of a control system of the functional cover according to the fourth embodiment of the present invention.

FIG. 4, shows a block diagram of a control system 400 of the functional cover 306 comprising an accelerometer 402. The accelerometer 402 communicates movement data to an analogue to digital (A/D) converter 404 in a processor 406, such as a micro-controller. The A/D converter 404 receives an analogue movement signal from the accelerometer 402 and converts it to a digital movement signal. The processor 406 retrieves an instruction set from a memory unit 408, such as an external flash memory, through a high speed data carrying bus (SPI) 410. The processor 406 utilises the digital movement signal to generate a signal to the mobile communication device in accordance with the instruction set associated with the movement signal. The instruction set may be curser actions combined with sounds or other application type instructions.

The control system 400 further comprises a terminal 412 for connecting to the mobile communication device 300. When the functional cover 306 is mounted on the mobile communication device 300 the control system 400 powers up. The terminal 412, which comprises a plurality of pins, such as 3, 5 or 8 pins, provides a power signal to a regulator 414 for regulating power to the processor 406. The regulator 414 may be any type of regulator known to a person skilled in the art.

The terminal 412 further enables communication between the functional cover 306 and the mobile communication device 300 through a level shifting unit 416 shifting the voltage level of the communication received from the mobile communication device 300 to a voltage level compatible with the functional cover 306. The processor 406 communicates with the mobile communication device 300 through an interface element 418 for establishing communication protocol.

The mobile communication device may comprise one or more functional covers, hence both the functional covers 202, 306 may in fact be connected to the same mobile communication device. Further, it should be realized that the communication between the mobile communication device and the functional covers may utilise any protocol and elements known to a person skilled in the art.

What is claimed is:

1. A functional cover for connecting to a mobile communication device and comprising an accelerometer for measuring movement of said functional cover and providing a movement signal, a memory for storing an instruction set, and a processor for selecting an instruction from said instruction set in said memory in accordance with said movement signal.

2. A functional cover according to claim 1, wherein said accelerometer comprises a first sensor measuring movement along a first axis aligned longitudinally to said functional cover and a second sensor measuring movement along a second axis perpendicular to said first axis.

3. A functional cover according to claim 2, wherein said accelerometer comprises a third sensor measuring movement along a third axis perpendicular to said first and second axis.

4. A functional cover according to claim 1, wherein said memory comprises flash memory capacity.

5. A functional cover according to claim 1, wherein said processor comprises a micro-controller.

6. A functional cover according to claim 1, wherein said processor connecting to said memory through a high-speed data carrying bus.

7. A functional cover according to claim 1, wherein said processor comprising an interface element for controlling communication between said functional cover and a mobile communication device in accordance with a communication protocol.

8. A functional cover according to claim 1, wherein said instruction set comprising internal or external operation system instructions, application instructions or any combination thereof.

9. A functional cover according to claim 1, wherein said instruction set comprising cursor operations such as up, down, left, and/or right.

10. A functional cover according to claim 1, wherein said functional cover is adapted to control sound applications in accordance with movement of the functional cover.

11. A functional cover according to claim 1, wherein said functional cover is adapted to generate a sound in accordance with movement of the functional cover.

12. A functional cover according to claim 1, further comprising a synthesizer for generating an electrical audio signal in accordance with said movement signal and a loudspeaker unit adapted to receive said electrical audio signal and generate a sound in accordance herewith.

13. A functional cover according to claim 12, wherein said synthesizer is operable to generate a control signal and wherein said loud speaker unit comprising an amplifier for amplifying said electrical audio signal and adapted to receive said control signal.

14. A functional cover according to claim 13, wherein said control signal is operable to control frequency, clang, tone, pitch, loudness, volume, treble, and/or bas of said electrical audio signal.

15. A functional cover according to claim 12, wherein said processor is incorporated in said synthesizer.

16. A functional cover according to claim 12, wherein said memory is incorporated in said synthesizer.

17. A mobile communication device comprising connector means for connecting to a functional cover according to claim 1.

* * * * *